United States Patent [19]

Aagano et al.

[11] Patent Number: 4,655,590
[45] Date of Patent: Apr. 7, 1987

[54] METHOD OF COALESCING LASER BEAMS

[75] Inventors: Toshitaka Aagano; Yoshimi Takasaki, both of Kaisei, Japan

[73] Assignee: Fuji Photo Film Co., Ltd., Kanagawa, Japan

[21] Appl. No.: 641,689

[22] Filed: Aug. 17, 1984

[30] Foreign Application Priority Data

Aug. 18, 1983 [JP] Japan .................................. 58-150658

[51] Int. Cl.$^4$ ............................................. G01B 11/27
[52] U.S. Cl. .................................. 356/72; 219/121 LS; 219/121 LM; 356/152; 356/153
[58] Field of Search ................. 356/430, 72, 153, 152, 356/364, 353, 363, 301, 138; 219/121 LS, 121 LU, 121 LW, 121 LM, 121 LV, 121 LA, 121 LZ; 250/327.2

[56] References Cited

U.S. PATENT DOCUMENTS

| | | | |
|---|---|---|---|
| 3,432,240 | 3/1969 | Jackson | 356/72 X |
| 3,571,554 | 3/1971 | Baujoin | 219/121 LS X |
| 4,258,264 | 3/1981 | Kotera et al. | 250/484 |
| 4,319,839 | 3/1982 | Durran | 356/153 |
| 4,335,939 | 6/1982 | Stovell et al. | 219/121 LA X |
| 4,346,295 | 8/1982 | Tanaka et al. | 250/327.2 |
| 4,408,602 | 10/1983 | Nakajima | 219/121 LS X |

FOREIGN PATENT DOCUMENTS 56-11395 4/1981 Japan .

Primary Examiner—Vincent P. McGraw
Attorney, Agent, or Firm—Fleit, Jacobson, Cohn & Price

[57] ABSTRACT

A method of coalescing two or more laser beams employs an optical merging element such as a polarization beam splitter to make the laser beams substantially merged into a single laser beam of multiplied power. In the merged laser beam, however, the original laser beams cannot easily be perfectly aligned with each other. In order to have the laser beams perfectly mingled or coalesced at the position where they are focused on an object to be processed or an original to be read out or a recording medium, the original laser beams substantially merged into a single laser beam are collimated so that the collimated laser beams may be directed to the same focusing position on the object. To collimate the original laser beams in the merged beam, a part of the merged beam is split out and passed through a converging lens to cause the original laser beams focused to points on a pinhole plate by use of a converging lens, and the directions of the original laser beams are corrected to make the laser beams focused to the same point on the pinhole plate or coincide with the pinhole. By making these laser beams coincide with the pinhole, these laser beams are consequently collimated so that they can be focused to the same point on said object, whereby the laser beams are coalesced in effect.

7 Claims, 4 Drawing Figures

METHOD OF COALESCING LASER BEAMS

BACKGROUND OF THE INVENTION

1. Field of the Invention

This invention relates to a method of coalescing laser beams, and more particularly to a method of coalescing two or more laser beams on an object to get a multiplied power of the laser beams on the object. The "coalescing" means mingling or doubling of two or more laser beams on an object onto which the laser beams are to impinge in the doubled or multiplied power.

In the present invention, the two or more laser beams are first merged into a single laser beam in which the laser beams are substantially aligned with each other or one another to make a doubled or multiplied laser beam, in which however the laser beams are usually not perfectly merged into a single laser beam. In this specification, however, the laser beams thus merged or roughly mixed together are called "merged laser beams" or "a single merged laser beam" because they are substantially "merged". In a more precise sense, on the other hand, these laser beams first merged into a substantial single laser beam are not perfectly aligned with each other or one another but are out of perfect parallelism and out of perfect coincidence or alignment. In this sense, the laser beams thus merged are then "collimated" in a precise sense so that they are directed to a common focal point through a converging lens. Of course, the collimated laser beams after "merged" are so close to each other or one another that they advance through the substantially the same part of the same optical elements such as lenses and mirrors.

2. Description of the Prior Art

Laser beams are widely used for optical communication, measurement, processing such as laser welding, laser drilling, and the like. When two or more laser beams are used, it is often required to make them coalesced to get a multiplied power or a laser beam of wider wavelength coverage.

For example, in printing scanners, when a color image original is read out by use of a He-Ne laser beam, an Ar+ laser beam and a He-Cd laser beam and a monochromatic image is reproduced on a photosensitive material by use of the electric signal obtained by the read-out, it is necessary to converge three laser beams to a single point on the color image original for conducting the read-out. Also, in a radiation image recording and reproducing system as disclosed, for example, in U.S. Pat. Nos. 4,258,264 and 4,346,295, and Japanese Unexamined Patent Publication No. 56(1981)-11395, a stimulable phosphor sheet carrying a radiation image stored therein is scanned with a laser beam which causes the stimulable phosphor sheet to emit light in proportion to the radiation energy stored. The emitted light is detected and converted into an electric signal, and a photosensitive material is scanned with a laser beam modulated based on the electric signal by a light modulator, thereby reproducing an image in the photosensitive material. In this case, in order to increase the read-out speed and the reproducing speed, it is necessary to increase the scanning speed of the laser beam. However, if only the scanning speed of the laser beam is increased with the power thereof maintained on the same level, the intensity of the laser beam per unit area of the surface of the stimulable phosphor sheet or a film scanned thereby inevitably becomes low. Therefore, it is necessary to increase the scanning speed and, at the same time, to increase the power of the laser beam. In order to increase the power of the laser beam, the output power of the laser beam source should be increased. However, when the output power of the laser beam source is increased, the size of the laser beam source inevitably becomes large, and the problem that the laser beam source cannot be incorporated in the radiation image recording and reproducing system or the problem that the radiation image recording and reproducing system must be made large arises. One approach to elimination of the problem is to use two laser beam sources and to coalesce the laser beams emitted thereby by use of an optical merging means such as a polarization beam splitter or a diffraction grating, thereby multiplying the laser beam power. This method is based on the finding that, in the case where the same level of laser beam power should be obtained, it is possible to make the size of the laser beam emitting system smaller when two laser beam sources are used and the laser beams emitted thereby are merged than when a single laser beam source is used. However, also in this method, it is required to make the two laser beams align with each other. The same thing is required also in laser processing apparatuses such as laser welding apparatuses.

However, the step of making two or more very thin laser beams align with each other is not always easy to conduct, or requires a complicated mechanism, or requires much time to adjust the mechanism.

SUMMARY OF THE INVENTION

The primary object of the present invention is to provide a method of simply coalescing two or more laser beams in an apparatus using a lens having a positive power for converging the laser beams onto a surface of an object, such as a printing scanner, a radiation image recording and reproducing system, or a laser processing apparatus.

Another object of the present invention is to provide a method of quickly coalescing two or more laser beams on the object upon which the laser beams are to impinge.

The method of coalescing laser beams in accordance with the present invention comprises the steps of:

(i) passing two or more laser beams respectively through direction correction means for two-dimensionally adjusting the direction of the laser beams, (ii) merging the laser beams substantially into a single laser beam by an optical merging means, (iii) passing said merged laser beam through a lens having a positive power and causing it to impinge upon a pinhole positioned at the focal length of said lens, (iv) detecting the amount of the laser beam passing through said pinhole by a photodetector, (v) detecting the direction of the laser beams respectively in which the amount of the laser beam passing through said pinhole becomes the maximum by operating said direction correction means, and (vi) adjusting the laser beams respectively in said detected direction.

The present invention is based on the finding that, in order to pass two or more laser beams through a lens having a positive power, such as an $f\theta$ lens, an $F \tan \theta$ lens, or an $F \sin^{-1} \theta$ lens, and to converge the laser beams to a single point to coalesce the laser beams on a surface of an object upon which the laser beams are to impinge, the direction of the two or more laser beams should be adjusted so that the laser beams advance toward the lens in parallel with each other. In the present invention, two or more laser beams are merged into a substantially single laser beam, and a part of the merged laser beam is taken out midway of the optical path. The taken out part of the merged laser beam is passed through the lens having a positive power and then through the pinhole positioned at the focal length of the lens. The direction of the two or more laser beams is adjusted so that the amount of the laser beam passing through the pinhole becomes the maximum. In this manner, it becomes possible to collimate the two or more laser beams and coalesce the laser beams on the object in effect.

In the present invention, when the wavelengths of the laser beams which should be coalesced are substantially the same, it is necessary to make the directions of polarization of the laser beams perpendicularly intersect each other, thereby preventing interference between the laser beams. In order to make the directions of polarization of two laser beams perpendicularly intersect each other, it is possible to use, for example, a method wherein one laser beam is passed through a half wavelength plate, or a method wherein one laser beam source is rotated 90° with respect to the other around the optical axis, or a method wherein the mounting direction of the Brewster's window of one laser beam source is deviated 90° with respect to that of the other laser beam.

As the optical merging means, it is possible to use a polarization beam splitter, a diffraction grating, a semi-transparent mirror, a Y-shaped optical fiber, or the like. However, when the method of the present invention is utilized for the purpose of increasing the laser power, a semi-transparent mirror is not suitable as the optical merging means. It should be noted here that, as explained hereinbefore, the "optical merging means" is an optical means which roughly merges or joins two or more laser beams into a substantially single laser beam wherein, however, the original laser beams may not perfectly aligned with each other or one another.

As the direction correction means, any means can be employed insofar as the beam direction can be adjusted two-dimensionally. Thus it is possible to employ, for example, a moveable prism, a moveable mirror, an acousto-optic modulator (AOM), an electro-optic device, a magneto-optic device, or the like.

DESCRIPTION OF THE PREFERRED EMBODIMENTS

The present invention will hereinbelow be described in further detail with reference to the accompanying drawings.

Figure 1:
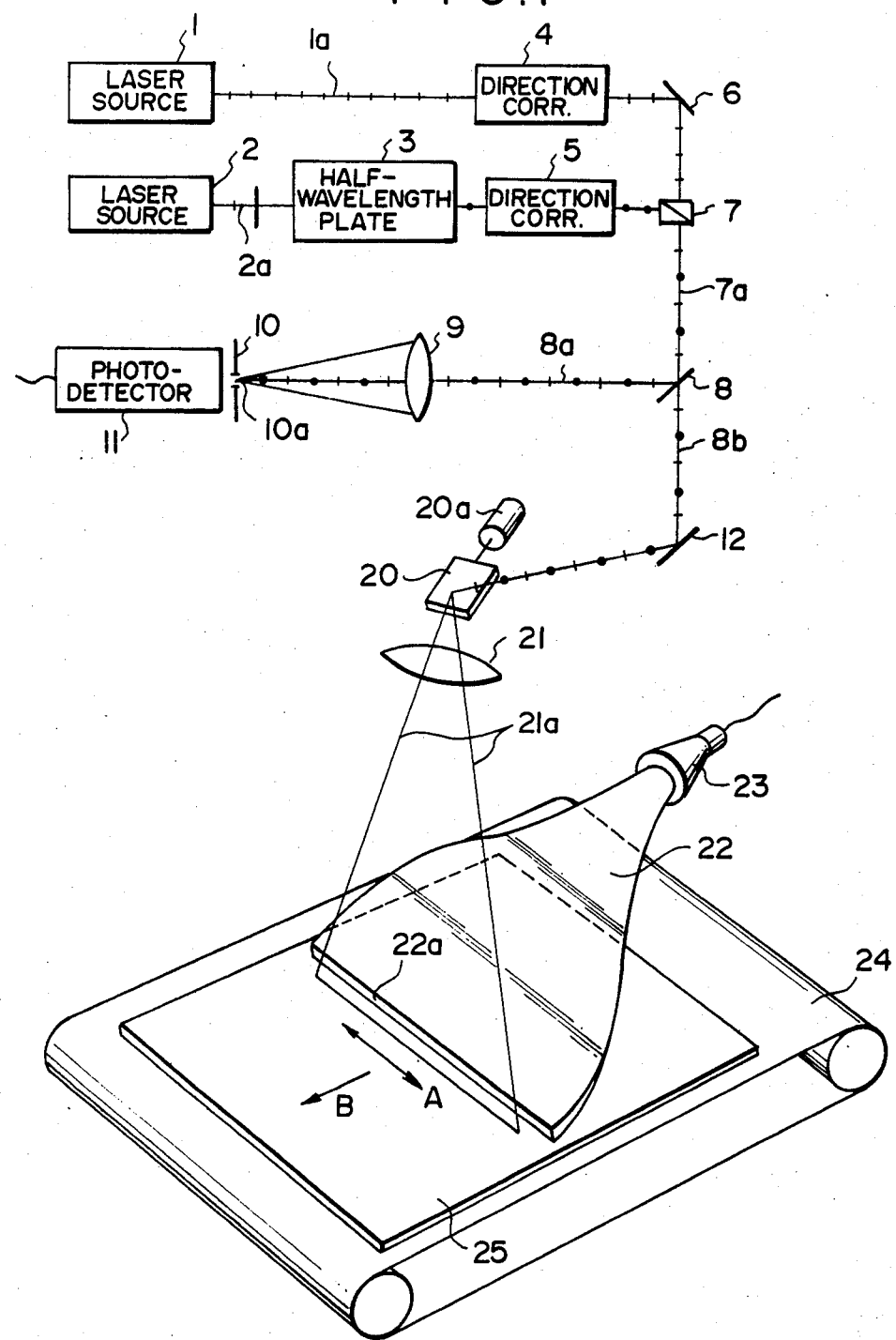
FIG. 1 is a schematic view showing a radiation image recording and read-out apparatus wherein a system for carrying out an embodiment of the method of coalescing laser beams in accordance with the present invention is employed.

Referring to FIG. 1, laser beams 1a and 2a are emitted from laser beam sources 1 and 2. The direction of the laser beam 1a is corrected by a first direction correction means 4, and the laser beam 1a is then made by a mirror 6 to impinge upon a polarization beam splitter 7 acting as an optical merging means. The laser beam 2a is a P-wave (Parallel polarized wave) when it is emitted by the laser beam source 2. It is then converted to an S-wave (Senkrecht polarized wave) by a half-wavelength plate 3. The direction of the laser beam 2a is then corrected by a second direction correction means 5, and the laser beam 2a is made to impinge upon the polarization beam splitter 7. The laser beams 1a and 2a impinging upon the polarization beam splitter 7 are merged thereby. Of the laser beams 1a and 2a impinging upon the polarization beam splitter 7 at different angles of incidence, the laser beam 1a directly passes through the polarization beam splitter 7. The direction of the laser beam 2a is changed by the polarization beam splitter 7, and the laser beam 2a is emitted thereby in the same direction as that of the laser beam 1a. Thus the laser beam 1a in the form of the P-wave as emitted by the laser beam source 1 and the laser beam 2a converted by the half-wavelength plate 3 to the S-wave after being emitted by the laser beam source 2 are merged by the polarization beam splitter 7, and a laser beam 7a having two planes of polarization perpendicularly intersecting each other is emitted from the polarization beam splitter 7. In this case, since the laser beam 7a consists of the P-wave and the S-wave and the planes of polarization are normal to each other, no wave interference arises and the power of the laser beam 7a is equal to the sum of the power of the laser beam 1a and the power of the laser beam 2a. The laser beam 7a is divided by a semi-transparent mirror 8 which has much higher transmittance than reflectance into a laser beam 8a of very low intensity and a laser beam 8b of high intensity. The laser beam 8a is reflected toward a convex lens 9 for detecting the parallelism of the laser beam 1a with the laser beam 2a. The laser beam 8b directly passes through the semi-transparent mirror 8 and reflected by a mirror 12 toward a galvanometer mirror 20.

The laser beam 8a reflected by the semi-transparent mirror 8 passes through the convex lens 9 and impinges upon a pinhole 10a of a pinhole plate 10 positioned at the focal point of the convex lens 9. In this manner, the amount of the laser beam 8a passing through the pinhole 10a is detected by a light amount detector 11. At this step, the directions of the laser beams 1a and 2a are corrected by the first direction correction means 4 and the second direction correction means 5 respectively as will be described hereinafter so that the amount of the laser beam 8a passing through the pinhole 10a becomes the maximum, i.e. so that both the laser beam component emitted by the laser beam source 1 and the laser beam component emitted by the laser beam source 2, which constitute the laser beam 8a, are focused on the pinhole 10a, whereby the laser beams 1a and 2a merged into the single laser beam 7a are collimated.

After the laser beams 1a and 2a are collimated, a stimulable phosphor sheet carrying a radiation image stored therein is fed to the read-out apparatus. The laser beam 8b consisting of the collimated laser beams 1a and 2a impinges upon the galvanometer mirror 20 driven by a galvanometer 20a and is caused thereby to impinge upon the stimulable phosphor sheet 25 positioned below the galvanometer mirror 20 so that the sheet 25 is scanned by the laser beam 8b in the main scanning direction, i.e. in the width direction of the sheet 25 as indicated by the arrow A. At this time, the laser beam 8b emitted by the galvanometer mirror 20 is adjusted by an fθ lens 21 having positive power so that it is focused on the sheet 25. Since the laser beam 8b is already adjusted so that the collimated two laser beam components thereof impinge in parallel with each other upon the fθ lens 21, the sheet 25 is scanned by the laser beam 8b having power which is equal to the sum of the power of the laser beam 1a and the power of the laser beam 2a. While the laser beam 21a impinges upon the sheet 25, the sheet 25 is conveyed in the sub-scanning direction as indicated by the arrow B, for example, by an endless belt device 24. Therefore, scanning in the main scanning direction is repeated at an angle normal to the sub-scanning direction, and the whole surface of the sheet 25 is two-dimensionally scanned by the laser beam 21a. As the sheet 25 is scanned by the laser beam 21a, the portion of the sheet 25 exposed to the laser beam 21a emits light having an intensity proportional to the radiation energy stored. The light emitted by the sheet 25 enters a transparent light guide member 22 from its front end face 22a positioned close to the sheet 25 in parallel to the main scanning line. The light entering the light guide member 22 is led to the rear end portion of the light guide member 22, and transferred to a photomultiplier 23 closely contacted with the rear end portion of the light guide member 22. The light is then detected and converted into an electric image signal by the photomultiplier 23 and sent to an image processing circuit (not shown).

Figure 2:
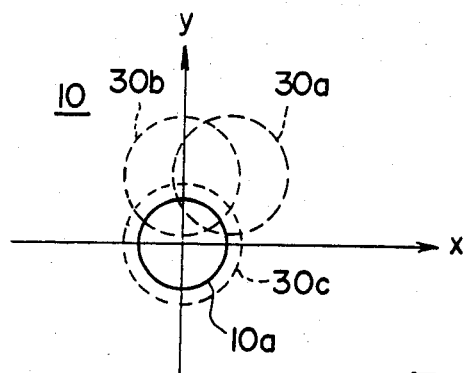
FIGS. 2 and 3 are front views showing the pinhole plate used in the method of the present invention, as viewed from the convex lens side.
Figure 3:
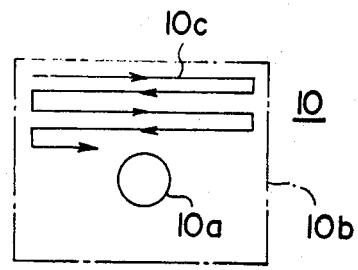

FIGS. 2 and 3 are front views showing the pinhole plate 10 of FIG. 1, as viewed from the convex lens 9. The method of detecting the directions of the laser beams 1a and 2a in which the amount of the laser beam 8a passing through the pinhole 10a becomes the maximum will hereinbelow be described with reference to FIGS. 2 and 3.

The detection of the directions of the laser beams may be carried out by detecting the amount of laser beams passing through the pinhole while the two laser beams are simultaneously emitted and passed through the pinhole. In this case, at first the sum of the amount of the two laser beams is detected and the maximum is detected by controlling the direction of one of the laser beams and then the direction of the other laser beam is controlled to further detect the maximum which may be higher than said first maximum. Alternatively, the detection of the directions of the laser beams may be carried out by detecting the amount of one of the laser beams at first by causing only one laser beam to be emitted first, and detecting the amount of the other laser beam by causing it to be emitted after the maximum has been found out. Hereinbelow, the former example will be described in detail.

First, the amount of laser beams emitted from the laser beam sources 1 and 2 passing through the pinhole 10a of the pinhole plate 10 is detected. At this time, for example, a circle 30a indicated by the broken line in FIG. 2 is assumed to be the region on the pinhole plate 10 upon which one of the laser beams impinges. For simplicity of explanation, the vertical direction of the drawing sheet of FIG. 2 is assumed to be the y axis, and the horizontal direction thereof is assumed to be the x axis. Then, one of the laser beams is moved in the x-axis direction by the direction correction means to find a position where the amount of the laser beam passing through the pinhole 10a becomes the maximum. The amount of the laser beams passing through the pinhole 10a becomes the maximum when the degree of overlapping of the region upon which the laser beam impinges and the pinhole 10a is the maximum, i.e. when the center of the region upon which the laser beam impinges is on the y axis as indicated by a circle 30b. Thereafter, said one of the laser beams is moved in the y-axis direction to find a position where the amount of the laser beams passing through the pinhole 10a becomes the maximum. In this case, the amount of the laser beams passing through the pinhole 10a becomes the maximum when the region upon which said one of the laser beams impinges completely overlaps the pinhole 10a, i.e. when the center of the region upon which the laser beam impinges coincides with the center of the pinhole 10a as indicated by a circle 30c. In this manner, it is possible to make one of the laser beams coincide with the pinhole 10a. By making the other laser beam emitted from the other laser beam source coincide with the pinhole 10a in the same manner, it is possible to collimate the two laser beams.

The method described above with reference to FIG. 2 is advantageous when the region of the pinhole plate 10 upon which the laser beam impinges partially overlaps the pinhole 10a. However, in the case where they do not overlap, this method is not always operable since the amount of the laser beam passing through the pinhole 10a often remains zero even when the laser beam is moved in the x-axis direction or in the y-axis direction. Therefore, the method as shown in FIG. 3 should preferably be used. In the method of FIG. 3, a region 10b (as surrounded by the chain line) on the pinhole plate 10 is determined in advance so that each laser beam always impinges upon the pinhole plate 10 within said region 10b. The inside of the region 10b is scanned by the laser beam forwardly and backwardly, for example, as indicated by the line 10c, and the position where the amount of the laser beam passing through the pinhole 10a becomes the maximum is found.

Figure 4:
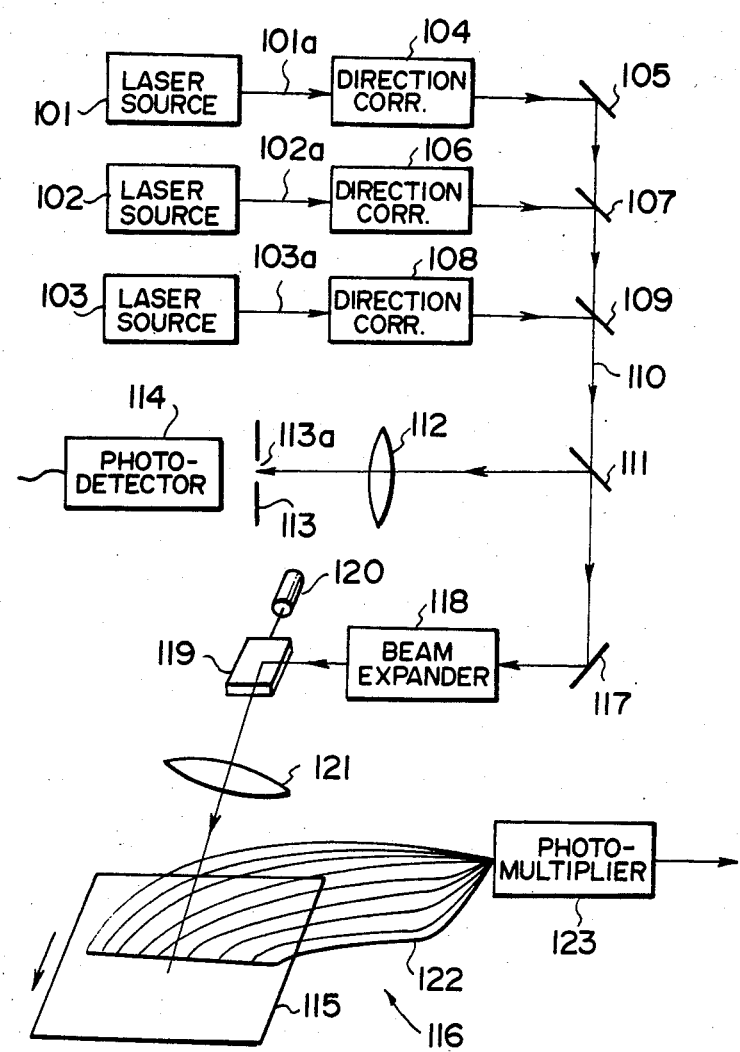
FIG. 4 is a schematic view showing a color original read-out apparatus provided with a system for carrying out another embodiment of the method of the present invention is employed.

FIG. 4 shows another embodiment of the method in accordance with the present invention, which is applied to a color original read-out apparatus.

In FIG. 4, a He-Ne laser beam 101a, an Ar+ laser beam 102a, and a He-Cd laser beam 103a are respectively emitted from laser beam sources 101, 102, and 103. The direction of the He-Ne laser beam 101a is corrected by a first direction correction means 104, and then the He-Ne laser beam 101a is made by a mirror 105 to impinge upon a semi-transparent mirror 107. The direction of the Ar+ laser beam 102a is corrected by a second direction correction means 106. The Ar+ laser beam 102a is merged with the He-Ne laser beam 101a by a semi-transparent mirror 107 and is made to impinge upon a semi-transparent mirror 109. The direction of the He-Cd laser beam 103a is corrected by a third direction correction means 108. The He-Cd laser beam 103a is then merged with the He-Ne laser beam 101a and the Ar+ laser beam 102a by the semi-transparent mirror 109 and is made to impinge upon a semi-transparent mirror 111. In this manner, the He-Ne laser beam 101a, the Ar+ laser beam 102a, and the He-Cd laser beam 103a are merged into a laser beam 110, and the merged laser beam 110 is made to impinge upon the semi-transparent mirror 111. A part of the merged laser beam 110 is reflected by the semi-transparent mirror 111 toward a convex lens 112. Thus the laser beams 101a, 102a, and 103a are collimated in the same manner as described above by use of a pinhole plate 113 provided with a pinhole 113a and a light amount detector 114.

After the laser beams 101a, 102a and 103a are collimated, a color original 115 is fed to a read-out apparatus 116. The direction of the laser beam 110 consisting of the collimated three laser beams 101a, 102a and 103a passing through the semi-transparent mirror 111 is changed by a mirror 117. The laser beam 110 is then passed through a beam expander 118 and is made to impinge upon a galvanometer mirror 119 which is driven by a galvanometer 120. The laser beam 110 is made by the galvanometer mirror 119 to impinge upon the color original 115 so that the color original 115 is scanned by the laser beam 110 in the width direction thereof. At this time, the laser beam 110 emitted by the galvanometer mirror 119 is adjusted by an $f\theta$ lens 121 having positive power so that it is focused on the color original 115. While the laser beam 110 impinges upon the color original 115, the color original 115 is moved in the direction normal to the width direction thereof. Therefore, the whole surface of the color original 115 is scanned by the laser beam 110. A plurality of optical fibers 122 are positioned close to the scanning surface of the color original 115 so that light reflected from the surface is collected efficiently. The light reflected by the color original 115 is passed through the optical fibers 122 to a photomultiplier 123 and is converted into an electric image signal. The electric image signal thus obtained is processed, and a monochromatic image is reproduced on a photosensitive material by use of the processed image signal.

It should be understood that the present invention can be embodied in various types other than the above described embodiments.

For instance, instead of manually adjusting the direction correction means 4 and 5 shown in FIG. 1 so that the amount of the laser beam 8b passing through the pinhole 10a becomes the maximum, it is also possible to adjust the directions of the laser beams 1a and 2a automatically so that the amount of the laser beam 8b passing through the pinhole 10a becomes the maximum by feeding the output of the light amount detector 11 back to the first direction correction means 4 and the second direction correction means 5 and by forming a servo mechanism. It is also possible to adjust the directions of the laser beams 1a and 2a automatically by conducting scanning by the laser beams 1a and 2a over predetermined regions on the pinhole plate 10 by use of the direction correction means 4 and 5, by detecting the positions of the direction correction means 4 and 5 where the amount of the laser beam passing through the pinhole 10a becomes the maximum during the scanning by use of a microcomputer, by storing the signals representing the positions of the direction correction means 4 and 5 in a memory, by reading out the position signals from the memory, and by fixing the direction correction means 4 and 5 at the positions represented by the position signals. In this case, it is possible to coalesce two or more laser beams on the object more quickly than when manual adjustment is conducted.

Also, in FIG. 1, instead of using the semi-transparent mirror 8, it is possible to use a removable mirror. In this case, the mirror is used only when the parallelism of the laser beams 1a and 2a is detected, and the laser beam 7a emitted by the polarization beam splitter 7 is directly made to impinge upon the mirror 12 other than when the parallelism of the laser beams 1a and 2a is detected.

In the embodiment of FIG. 1, the laser beams 1a and 2a are coalesced before the read-out of the radiation image is started. However, the present invention is not limited to the case where the laser beams are coalesced before the read-out operation is started. For example, it is also possible to conduct the method of the present invention when the two or more laser beams become out of alignment during the operation using the laser beams, or the like.

Further, the method of the present invention can be applied for coalescing four or more laser beams.

We claim:

1. A method of coalescing laser beams comprising the steps of:
   (i) passing two or more laser beams through two or more respective direction correction means for independently and two-dimensionally adjusting the direction of the respective laser beams,
   (ii) merging the laser beams substantially into a single laser beam by an optical merging means,
   (iii) passing a portion of said merged laser beam through a lens having a positive power and causing it to impinge upon a pinhole positioned at the focal length of said lens,
   (iv) detecting the amount of the laser beam passing through said pinhole by a photodetector,
   (v) detecting the direction of the laser beams respectively in which the amount of the laser beam passing through said pinhole becomes the maximum by operating said respective direction correction means,
   (vi) adjusting the laser beams respectively in said detected direction,
   (vii) passing the remaining portion of said merged laser beam through a further lens having a positive power for converging and coalescing the remaining portion of said merged laser beam onto said surface of said object.

2. A method as defined in claim 1 wherein said optical merging means is selected from the group consisting of a polarization beam splitter, a diffraction grating, a semi-transparent mirror, and a Y-shaped optical fiber.

3. A method as defined in claim 1 wherein said direction correction means is selected from the group consisting of a moveable prism, moveable mirror, an acousto-optic modulator, an electro-optic device, and a magneto-optic device.

4. A method as defined in claim 1 wherein, when two laser beams having substantially equal wavelengths are coalesced, directions of polarization of the laser beams are adjusted to perpendicularly intersect each other before the laser beams are passed through said direction correction means.

5. A method as defined in claim 1 wherein said directions of the laser beams are detected when the amount of said merged laser beam passing through said pinhole becomes the maximum and are detected by scanning a pinhole plate provided with said pinhole by said laser beams.

6. A method as defined in claim 5 wherein signals representing the positions of said direction correction means corresponding to said directions of the laser beams are stored in a memory, and said direction correction means are fixed at said positions by reading out said position signals from said memory.

7. A method as defined in claim 1 wherein an output of said photodetector is fed back to said direction correction means and a servo mechanism is formed to automatically adjust the directions of the laser beams based upon determining when the amount of the laser beam passing through said pinhole becomes the maximum.

* * * * *